June 9, 1942.   J. M. TOWLER ET AL   2,286,027
HYDRAULIC REDUCING VALVE
Filed April 9, 1941   2 Sheets-Sheet 1

INVENTOR
John Maurice Towler
Frank Nathan Towler
BY
ATTORNEY

June 9, 1942.　　J. M. TOWLER ET AL　　2,286,027
HYDRAULIC REDUCING VALVE
Filed April 9, 1941　　2 Sheets-Sheet 2

INVENTOR

Patented June 9, 1942

2,286,027

UNITED STATES PATENT OFFICE 2,286,027

HYDRAULIC REDUCING VALVE

John Maurice Towler and Frank Hathorn Towler, Yorkshire, England

Application April 9, 1941, Serial No. 387,764
In Great Britain December 12, 1939

4 Claims. (Cl. 50—35)

This invention relates to hydraulic reducing valves of the plunger type and one of the objects of the invention is to provide such a valve which will be both simple in construction and sensitive to small differences of pressure.

A hydraulic reducing valve according to the present invention broadly comprises a valve body having a parallel and longitudinal bore, an inlet and outlet for the pressure liquid extending through the wall of said body into said bore in predetermined longitudinal spaced relationship to each other, a plunger slidably mounted within said bore, passages in said plunger arranged so that in one position of the plunger pressure liquid may pass therethrough from said inlet to said outlet, and in another position of the plunger said inlet and outlet are isolated from each other and the passage of pressure liquid therebetween is prevented, a spring adapted to bear against one end of the plunger to hold the same in one or other of said positions, a space to receive the end of the plunger which is opposite to the end against which the spring bears, and means serving to place said space in communication with either the inlet or the outlet whereby pressure liquid is enabled to act on the exposed end of the plunger and, when the pressure of the liquid within the space is sufficient to move the plunger longitudinally against said spring, either to permit liquid to flow through the valve from the inlet to the outlet or to isolate said inlet and outlet one from the other and prevent the passage therebetween of pressure liquid.

The term "reducing valve" used throughout this specification is to be taken as meaning both a reducing valve in which the valve plunger is subject to the outlet pressure of the pressure liquid and a relief valve in which the valve plunger is subject to the inlet pressure of the liquid.

One embodiment of this invention consists of a hydraulic reducing valve of the packingless plunger type, comprising a valve body having a parallel bore in which the plunger is a close sliding fit. The plunger is of parallel cylindrical form having a central bore open at one end and closed at the other end and having a row of radial passages situated at the closed end of the said bore. A spring housing is attached to one end of the valve body and contains a compression spring which acts upon the closed end of the plunger and suitable means are provided for varying the pressure of the spring upon the plunger. The other end of the valve body remote from the spring housing is closed and a suitable stop is provided to limit the movement of the plunger towards the closed end of the valve body. When the plunger is up against the stop, the radial passages in the plunger place the central bore of the plunger in communication with an annular passage in the valve body and this annular passage is connected to the inlet passage of the valve. The outlet passage in the valve body communicates with the closed end of the valve bore and is therefore in constant communication with the central bore of the plunger. Thus, the operation of the valve is as follows:

When the plunger is up against the stop the hydraulic supply from the inlet passage passes from the annulus in the valve bore through the radial passages into the central bore of the plunger and thence to the outlet passage of the valve. When the pressure in the outlet passage reaches a given figure the plunger compresses the spring and in so doing the radial passages in the plunger move out of communication with the inlet annulus and therefore close off the supply. If the pressure in the outlet passage falls appreciably below a given figure the spring will cause the plunger to move towards the stop, thereby bringing the radial passages into communication with the inlet annulus and so placing the hydraulic supply into communication with the outlet passage so as to make up pressure again.

In a further embodiment of the invention the pressure liquid passes through the valve by way of passages in the plunger said passages comprising two or more circumferential grooves in the surface of the plunger arranged so that one of said grooves can register with the valve inlet and another of said grooves with the valve outlet in a manner hereafter to be described, an internal longitudinal passage within the plunger, and radial passages from said grooves to the longitudinal passage.

In order that the invention may be clearly understood and carried into effect four examples of valve will now be described by aid of the accompanying drawings in which.

Figure 1:
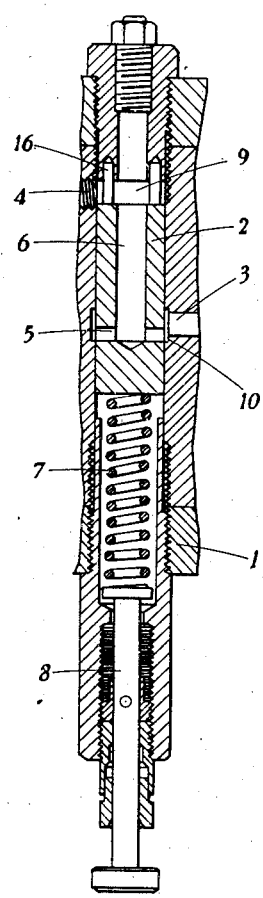
Fig. 1 illustrates a reducing valve according to the first above described embodiment, which reducing valve has a single cut-off and therefore one pressure drop.

The drawings with the exception of Fig. 1, in each case show the valve plunger in the position assumed when moved by the pressure partially to compress the spring.

The hydraulic valve in each of the examples illustrated comprises a valve body 1 having a parallel bore for the slidable reception of a valve plunger 2. The valve body has an inlet 3 and an outlet 4 for the pressure liquid arranged in predetermined longitudinal spaced relationship to each other, radial passages 5 and a longitudinal internal passage 6 for the controlled transfer of pressure liquid through the valve from the inlet to the outlet. Opposing one end of the plunger is a spring 7 adapted to resist longitudinal movement of the plunger with a predetermined pressure which is variable by means of an adjusting screw 8. At the opposite end of the plunger is a space 9 which is open to receive pressure fluid at outlet pressure in the case of the reducing valve and at inlet pressure in the case of the relief valve, the arrangement being such that when the pressure of the liquid within the space is sufficient to overcome the opposing pressure of the spring, the plunger will be moved to compress the spring to isolate the inlet from the outlet in the case of the reducing valve and prevent the passage therebetween of pressure liquid until the pressure in said space falls, or in the case of the relief valve to permit liquid to flow through the valve from the inlet to the outlet.

In the particular example of reducing valve illustrated in Fig. 1 the radial passages are arranged to provide a communication between an annular space 10 in the valve bore and the closed end of the internal passage 6, said annular space coinciding with the inlet 3. Movement of the valve plunger under the pressure of the hydraulic liquid within the space 9 thus causes the radial passages to be moved out of registration with the annular space 10. This construction of valve thus provides a single cut-off or pressure drop.

Figure 2:
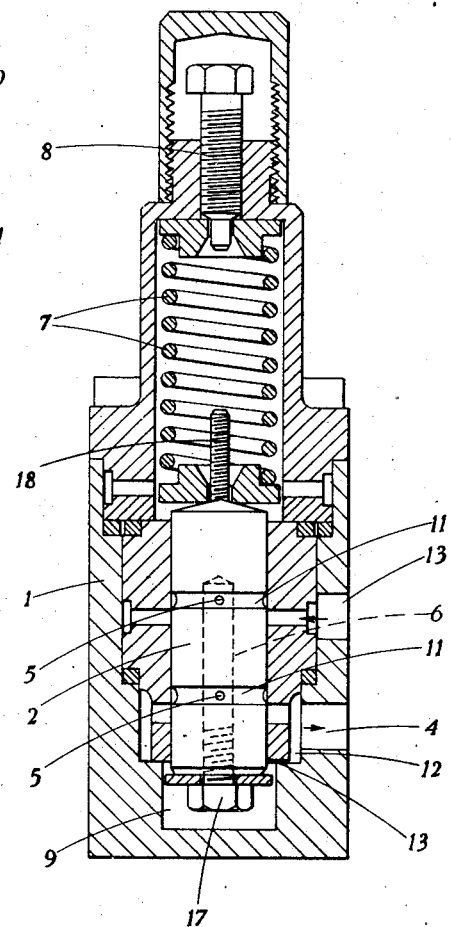
Fig. 2 illustrates an example of a reducing valve according to the invention having two cut-offs.

In the example of valve illustrated in Fig. 2 the annular space 10 is dispensed with and in lieu thereof there is provided a circumferential groove 11 in the surface of the plunger, one of said grooves being adapted to register with the inlet and another with the outlet. In this example of valve the pressure liquid at the outlet has admission to the space 8 by way of an annular recess 12 and a groove 13. This valve thus provides two cut-offs or pressure drops.

Figure 3:
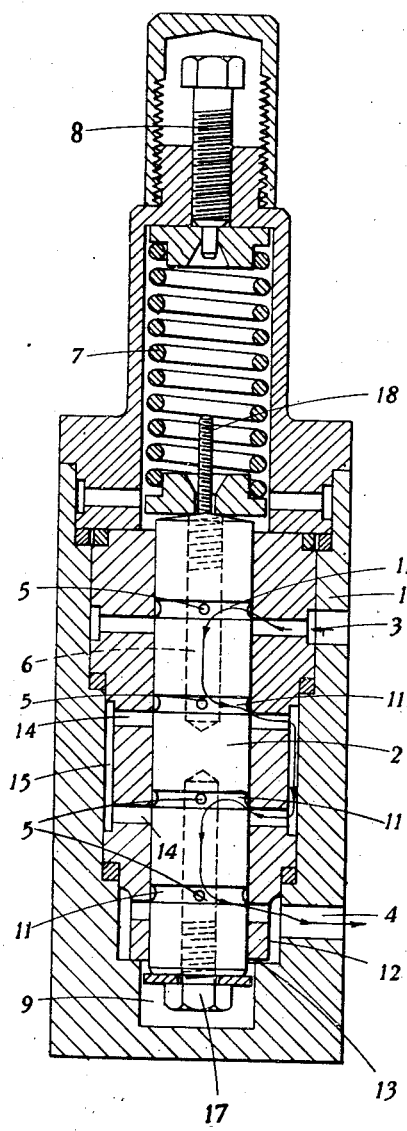
Fig. 3 illustrates a further example of reducing valve of the kind illustrated in Fig. 2 but constructed so as to provide four cut-offs.

In the embodiment illustrated in Fig. 3 there are four grooves 11 arranged in the length of the valve plunger whilst the internal passage is divided into two separate portions, two of the grooves being associated with one portion of the internal passage and the other two grooves with the second passage portion. The liquid passes from one portion of the internal passage to the other by way of lateral passages 14 and an annular space 15 common to said lateral passages. This valve thus provides four cut-offs or pressure drops for the liquid.

Figure 4:
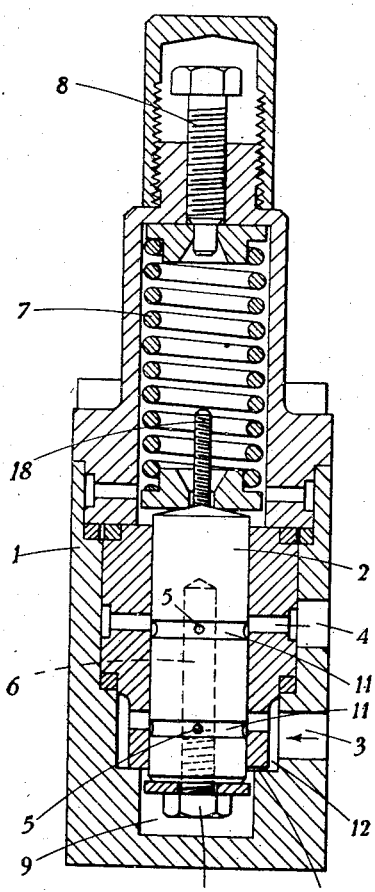
Fig. 4 illustrates a valve of the kind illustrated in Fig. 2 but modified to permit the same to function as a relief valve.

The valve illustrated in Fig. 4 and adapted to operate as a relief valve is similar in construction to the valve illustrated in Fig. 2 but is modified so that longitudinal movement of the plunger under the inlet pressure of the pressure liquid causes the grooves 11 to move from a position where they are normally out of registration with the inlet and outlet to a position where the same register. Thus in the normal position of the plunger liquid is prevented from passing through the valve from the inlet to the outlet whilst in the other position of the plunger such liquid is permitted to flow through the valve from the inlet to the outlet.

In each example illustrated the valve plunger is normally forced by its spring against a stop. In Fig. 1 this stop is constituted by pins 16 whilst in the other examples illustrated it is provided by the head 17 of a screwed plug which head is held against the bottom of the recess 9 by the said spring pressure. In these latter examples of valve there may also be provided a stem 18 projecting from one end of the valve plunger by means of which the plunger can be withdrawn when dismantling the valve.

What we claim is:

1. A hydraulic reducing valve, embodying a housing having a high pressure fluid inlet and a longitudinally spaced low pressure outlet formed therein, a sleeve mounted in said housing, said sleeve having passages in fixed communication with said inlet and said outlet respectively, longitudinally spaced lateral passages in said sleeve intermediate the passages thereof communicating with said inlet and said outlet, said intermediate passages being connected externally of said sleeve, a plunger slidable within said sleeve, having two relatively spaced axially disposed bores, each of which is closed at both its ends, peripheral grooves on said plunger relatively spaced for registration with said inlet and said outlet, respectively, radial passages connecting each of said grooves with a bore, adapted to establish communication between said inlet and one of said bores and between said outlet and the other of said bores, a pressure chamber at one end of said housing, means of communication between said chamber and said outlet external of said sleeve, spring means associated with said housing effective on said plunger to urge the latter toward said chamber and means communicating with said plunger bores, independently of said grooves, formed for registration with said intermediate sleeve passages, when said grooves are aligned with said inlet and outlet to open communication between said inlet and said outlet through said plunger and said passage external of said sleeve, for the transfer of fluid from said inlet to said outlet, said plunger reacting to back pressure in said chamber, in opposition to said spring, to diminish the effective areas of said inlet and said outlet, the passage of fluid from one plunger bore to the other being retarded by a concurrent closure of said intermediate sleeve passages, to reduce the outlet pressure in a series of controlled stages.

2. A hydraulic reducing valve embodying a housing having a high pressure fluid inlet and a longitudinally spaced low pressure outlet formed therein, a sleeve mounted in said housing having passages in fixed communication with said inlet and outlet respectively, a plunger, bored longitudinally, slidable within said sleeve, peripheral grooves on said plunger, relatively spaced for registration with said inlet and said outlet respectively, radial passages connecting the bored portion of said plunger with said grooves for establishing communication between said bored portion and said inlet and said outlet respectively, a pressure chamber at one end of said housing, means of communication between said chamber and said outlet external of said sleeve, a spring mounted in said housing in bearing engagement with said plunger to urge the latter toward said chamber and means intermediate said peripheral grooves and the inlet and outlet passages in said sleeve adapted to cooperate to provide a path for the fluid movement from said inlet to said outlet, when said grooves are in registration with said inlet and outlet passages respectively, said latter means, when said plunger reacts to back pressure in said chamber to reduce the effective areas of the inlet and outlet, coacting concurrently with the plunger movement to reduce the outlet pressure in a series of controlled stages.

3. A hydraulic reducing valve embodying a housing having a high pressure fluid inlet and a relatively longitudinally spaced low pressure outlet formed therein, a sleeve mounted in said housing having passages in fixed communication with said inlet and said outlet respectively, a plunger closed at both ends, having axially spaced bores, slidable within said sleeve, peripheral grooves on said plunger relatively spaced for registration with the inlet and outlet passages in said sleeve, radial passages connecting each of said grooves with a bore to establish communication between said inlet passage and one of said bores and between the outlet passage and the other of said bores, a pressure chamber at one end of said housing, means of communication between said chamber and said outlet, independent of said sleeve, spring means supported in said housing in bearing engagement with said plunger to urge said plunger toward said chamber and means separate from said grooves for establishing communication between said inlet and said outlet through said plunger bores and said sleeve for the transfer of fluid at inlet pressure from said inlet to said outlet, said plunger being adapted to react to back pressure in said chamber, in opposition to said spring, to reduce the areas of said inlet and said outlet, said latter means concurrently becoming effective to control the reduction of the outlet pressure in varying stages.

4. A hydraulic reducing valve, embodying a housing having a high fluid pressure inlet and a low pressure outlet relatively longitudinally spaced in the wall thereof, a sleeve mounted in said housing, said sleeve being provided with passages in fixed alignment with said inlet and said outlet, a plunger sealed at both ends slidably mounted in said sleeve, said plunger having an axially disposed bore, a pair of peripheral grooves spaced longitudinally of said plunger, each having radial passages connecting it to said plunger bore, a pressure space between one end of said plunger and said housing, a communicating passage between said space and said outlet, a spring supported in said housing in bearing engagement with the other end of said plunger acting to urge said plunger toward said space, means for adjusting the pressure of said spring and an adjustable stop for limiting the movement of said plunger in said space, under the influence of said spring to align said grooves respectively with said inlet and outlet passages of said sleeve, whereby communication is established between said inlet and outlet, through said plunger and said sleeve, said plunger being adapted to move in opposition to said spring in response to back pressure in said space to simultaneously diminish the areas of the inlet and outlet passages of said sleeve and thereby reduce the fluid pressure at said outlet.

JOHN MAURICE TOWLER.
FRANK HATHORN TOWLER.